US009007196B2

(12) United States Patent
Reed et al.

(10) Patent No.: US 9,007,196 B2
(45) Date of Patent: Apr. 14, 2015

(54) COST EFFECTIVE AUTO-ACTUATION DOOR CHECK

(75) Inventors: Eric L. Reed, Livonia, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 13/325,241

(22) Filed: Dec. 14, 2011

(65) Prior Publication Data

US 2013/0154792 A1 Jun. 20, 2013

(51) Int. Cl.
*B60Q 1/00* (2006.01)

(52) U.S. Cl.
CPC ........... *E05F 15/43* (2015.01); *E05F 2015/433* (2015.01); *E05Y 2400/32* (2013.01); *E05Y 2800/10* (2013.01); *E05Y 2900/531* (2013.01)

(58) Field of Classification Search
USPC ........... 340/932.2, 435, 3.1; 180/286; 701/36, 701/41, 300
See application file for complete search history.

(56) References Cited

U.S. PATENT DOCUMENTS 5,945,907 A 8/1999 Yaron et al.
6,205,710 B1 * 3/2001 Busse ............................... 49/27
6,215,415 B1 4/2001 Schroder
6,704,653 B2 * 3/2004 Kuriya et al. ................. 701/301
7,138,938 B1 11/2006 Prakah-Asante et al.
7,551,520 B2 6/2009 Korthals et al.
8,265,834 B2 * 9/2012 Inoue et al. ..................... 701/49
8,442,755 B2 * 5/2013 Kollar et al. .................. 701/301
8,504,245 B2 * 8/2013 Sasajima ......................... 701/41
8,638,238 B2 * 1/2014 Hsu et al. ................... 340/932.2
2005/0280518 A1 * 12/2005 Bartels et al. ................. 340/435
2006/0250297 A1 11/2006 Prakah-Asante et al.
2011/0063131 A1 3/2011 Toledo et al.
2011/0068953 A1 3/2011 Toledo et al.
2011/0087405 A1 4/2011 Moshchuk et al.
2012/0286974 A1 * 11/2012 Claussen et al. .............. 340/935

* cited by examiner

*Primary Examiner* — Steven Lim
*Assistant Examiner* — Ryan Sherwin
(74) *Attorney, Agent, or Firm* — Frank A. MacKenzie; Price Heneveld LLP

(57) ABSTRACT

A system for controlling movement of a motor vehicle door includes at least one sensor that detects a distance from the vehicle to an object near the vehicle. The sensor is also configured to provide input to an automatic parallel parking system of the vehicle. The system may include at least one ultrasonic sensor on each side of the vehicle to detect the distances to objects on opposite sides of a vehicle. The system utilizes a plurality of detected distances and vehicle positions or velocities to determine a location of the detected object relative to the vehicle. The system selectively actuates the door brake to prevent the vehicle door from contacting the detected object as the door is opened.

20 Claims, 4 Drawing Sheets

COST EFFECTIVE AUTO-ACTUATION DOOR CHECK

FIELD OF THE INVENTION

The present invention generally relates to a system that stops a vehicle door as it opens to prevent contact of the vehicle door with a nearby object.

BACKGROUND OF THE INVENTION

Vehicle doors typically include one or more detent points within their swing arc to hold the door at a fixed point short of fully open to help prevent door contact with adjacent objects. The detent point is typically a compromise between providing sufficient room for driver ingress/egress and door protection. Typically, a single detent cannot account for all door swing/opening scenarios.

Various infinite/variable door check or stop systems have been developed for the motor vehicle market. These systems may be designed to hold the door in position at whatever point door movement stops in the swing arc. In this manner a door can be opened as near to an adjacent object as desired, and the door check will hold it in position until the user applies a "overcoming" force to move the door out of that detent position. However, such systems suffer from various drawbacks.

Automatic door check systems that attempt to arrest door movement prior to contacting an adjacent object have also been developed. Such systems typically utilize one or more sensors (e.g. ultrasonic) mounted in the door to detect distance to adjacent objects and automatically stop door movement before contact. However, such systems may be costly, and the positioning of the sensor(s) may negatively affect the appearance of the vehicle door.

SUMMARY OF THE INVENTION

One aspect of the present invention is a system for controlling movement of a vehicle door relative to a primary vehicle structure. The system includes at least one ultrasonic sensor configured to detect a distance from a vehicle primary structure to an object in the vicinity of the vehicle. The ultrasonic sensor also provides input to a vehicle automatic parallel parking system. The system preferably includes at least two ultrasonic sensors configured to detect the distances to objects on opposite sides of a vehicle. The system utilizes a plurality of detected distances to a detected object taken at different times, and a plurality of vehicle positions or velocities at different times before a vehicle stops, and which correspond to the times at which the detected distances are taken. The system determines a location of the detected object relative to the vehicle primary structure, and the system selectively actuates the door brake to prevent the vehicle door from contacting the detected object as the door is opened. The system may also utilize vehicle yaw rate in addition to the vehicle velocity (or distance/odometer reading), and record the information at each buffer point of a rolling buffer. This data can be used to create a two dimensional mapping of objects next to the vehicle. The vehicle geometry and door swing path information can be utilized to selectively actuate the door brake.

DETAILED DESCRIPTION OF THE PREFERRED EMBODIMENTS

Figure 1:
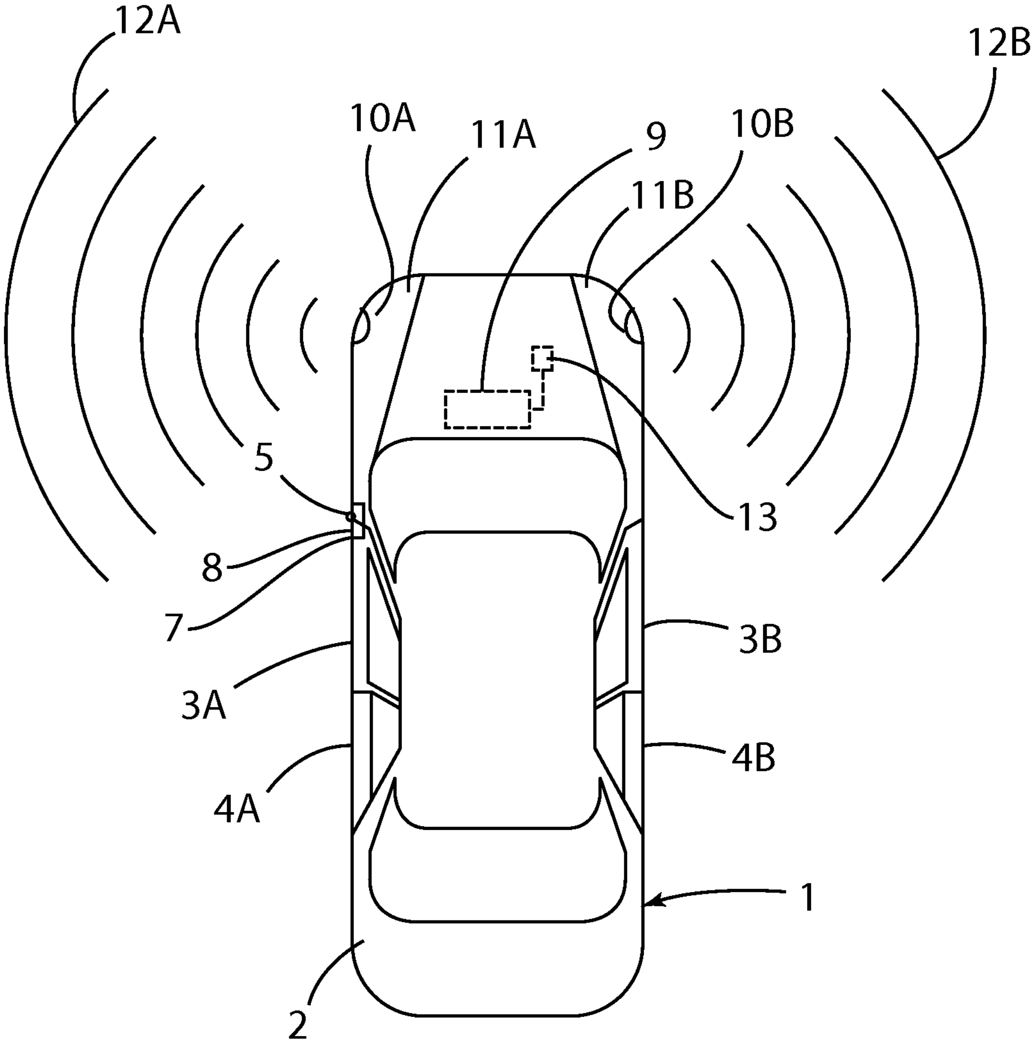
FIG. 1 is a partially schematic plan view of a motor vehicle including a door control system according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specifications are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes a primary vehicle structure 2, and front doors 3A and 3B, and rear doors 4A and 4B. Front door 3A is pivotally mounted to primary vehicle structure 2 for rotation about a generally vertical axis 5.

The vehicle 1 may include a door brake 8 comprising a powered actuator (not shown) that can be actuated by a vehicle controller 9 to stop movement of door 3A relative to primary vehicle structure 2. Vehicle 1 may also include a door position sensor 7 that senses an angle of the door 3A. Sensor 7 may comprise part of the door brake 8, or it may comprise a separately-positioned component. The door angle sensor 7 provides information to controller 9 concerning the angular position of door 3A relative to primary vehicle structure 2. The door brake 8 may comprise a known door brake or check actuator, and the details of door brake 8 will not therefore be described in detail herein. Doors 3B, 4A, and 4B may also include door angle sensor 7 and door brakes 8.

Motor vehicle 1 may also include one or more ultrasonic sensors 10A and 10B positioned in front quarter panels 11A and 11B, respectively, or other suitable location. Signals 12A and 12B from ultrasonic sensors 10A and 10B can be utilized to determine a location of an object relative to the primary vehicle structure 2. Sensors 10A and 10B may provide input to an automatic system for parallel parking (not shown) of motor vehicle 1. Automatic systems for parallel parking may include actuators that steer the front wheels, and control forward and rearward motion of a motor vehicle. Such systems are known, and the details of the automatic parallel parking system of vehicle 1 will not therefore be described in detail herein. The sensors 10A and 10B typically point to the side of the vehicle, and provide parking space and distance measurements among other functions. Since the sensors provide distance-to-object information, the sensors can be utilized to provide maximum door swing distance to an adjacent object for an automatic doorstop function.

Figure 2:
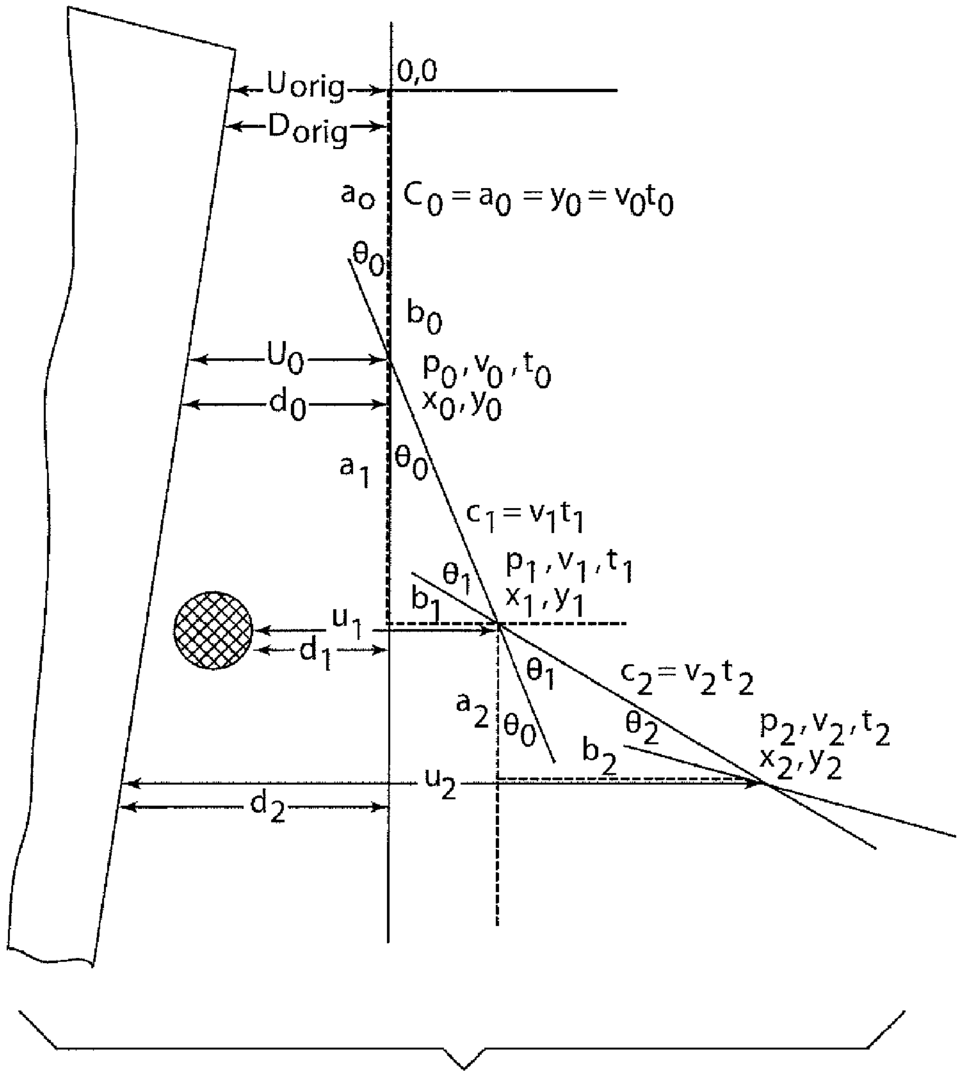
FIG. 2 is a schematic view of object mapping conducted utilizing data from an ultrasonic sensor.

The door swing limiting function can be performed using a rolling buffer of latitudinal distance to an adjacent object versus distance traveled over time where the buffer contains only the last amount of configurable distance traveled (for example 2 to 3 meters). The latitudinal information as determined from the side sensor 10A (or 10B) along with the vehicle velocity as determined by a velocity sensor 13 and vehicle yaw rate that may also be determined by sensor 13 or other sensor recorded at each buffer point can be used to create a two dimensional mapping of objects next to the vehicle. As shown in FIG. 2, object mapping using sensor 10A may be determined as follows:

Origin (0,0) Final stopping point of the side ultrasonic sensor p Yaw rate in *radians* per second at time interval $t_i$ v Vehicle velocity in meters per second at time interval $t_i$ t Interval time period. It is assumed that all interval time periods are equal ($t_0$)

u Ultrasonic measured distance to object at time interval $t_i$

θ Resultant angle traveled as a result of the yaw rate over the time interval $t_i$ i Interval count x,y Cartisian coordinates of the ultrasonic sensor relative to the final stopping point at time interval $t_i$ d Final distance of vehicle to object based on ultrasonic measured distance across longitudinal distance $y_i$ The overall angle, θ, is the summation of each angle $\theta_i$, where $\theta_i = p_i t_i$ Assume $t_i = t_0$ where $t_0$ is a constant value.

$$y_0 = a_0 = c_0 = v_0 t_0$$

$$x_0 = b_0 = 0$$

$$c_0 = v_0 t_0$$

$$d_0 = u_0 - x_0 = u_0$$

$$a_1 = c_1 \cos\theta_0 = v_1 t_1 \cos(p_0 t_0)$$

$$b_1 = c_1 \sin\theta_0 = v_1 t_1 \sin(p_0 t_0)$$

$$c_1 = v_1 t_1$$

$$x_1 = b_0 + b_1 = 0 + v_1 t_1 \sin(p_0 t_0)$$

$$y_1 = a_0 + a_1 = v_0 t_0 + v_1 t_1 \sin(p_0 t_0)$$

$$d_1 = u_1 - x_1 = u_1 - v_1 t_1 \sin(p_0 t_0)$$

$$a_2 = c_2 \cos(\theta_0 + \theta_1) = v_2 t_2 \cos(p_0 t_0 + p_1 t_1)$$

$$b_2 = c_2 \sin(\theta_0 + \theta_1) = v_2 t_2 \sin(p_0 t_0 + p_1 t_1)$$

$$c_2 = v_2 t_2$$

$$x_2 = b_0 + b_1 + b_2 = v_1 t_1 \sin(p_0 t_0) + v_2 t_2 \cos(p_0 t_0 + p_1 t_1)$$

$$y_2 = a_0 + a_1 + a_2 = v_0 t_0 + v_1 t_1 \sin(p_0 t_0) + v_2 t_2 \sin(p_0 t_0 + p_1 t_1)$$

$$d_2 = u_2 - x_2 = u_2 - [v_1 t_1 \sin(p_0 t_0) + v_2 t_2 \cos(p_0 t_0 + p_1 t_1)]$$

...

$$a_i = c_i \cos(\Sigma_{0\to i}\theta_n) = v_i t_i \cos(t_0 \Sigma_{0\to i-1} p_n) \text{ where } t_i = t_0$$

$$b_i = c_i \sin(\Sigma_{0\to i}\theta_n) = v_i t_i \sin(t_0 \Sigma_{0\to i-1} p_n) \text{ where } t_i = t_0$$

$$c_i = v_i t_i$$

$$x_i = \Sigma_{0\to i} b_n = v_1 t_1 \sin(p_0 t_0) + v_2 t_2 \cos(t_0 \Sigma_{0\to 1} p_n) + \ldots + v_i t_i \cos(t_0 \Sigma_0 \Sigma_{0\to i-1} p_n)$$

$$y_i = \Sigma_{0\to i} a_n = v_0 t_0 + v_1 t_1 \sin(p_0 t_0) + v_2 t_2 \sin(t_0 \Sigma_{0\to 1} p_n) + \ldots + v_i t_i \sin(t_0 \Sigma_{0\to i-1} p_n)$$

$$d_i = u_i - x_i = u_i - [v_0 t_0 + v_1 t_1 \sin(p_0 t_0) + v_2 t_2 \sin(t_0 \Sigma_{0\to 1} p_n) + \ldots + v_i t_i \sin(t_0 \Sigma_{0\to i-1} p_n)]$$

Figure 3:
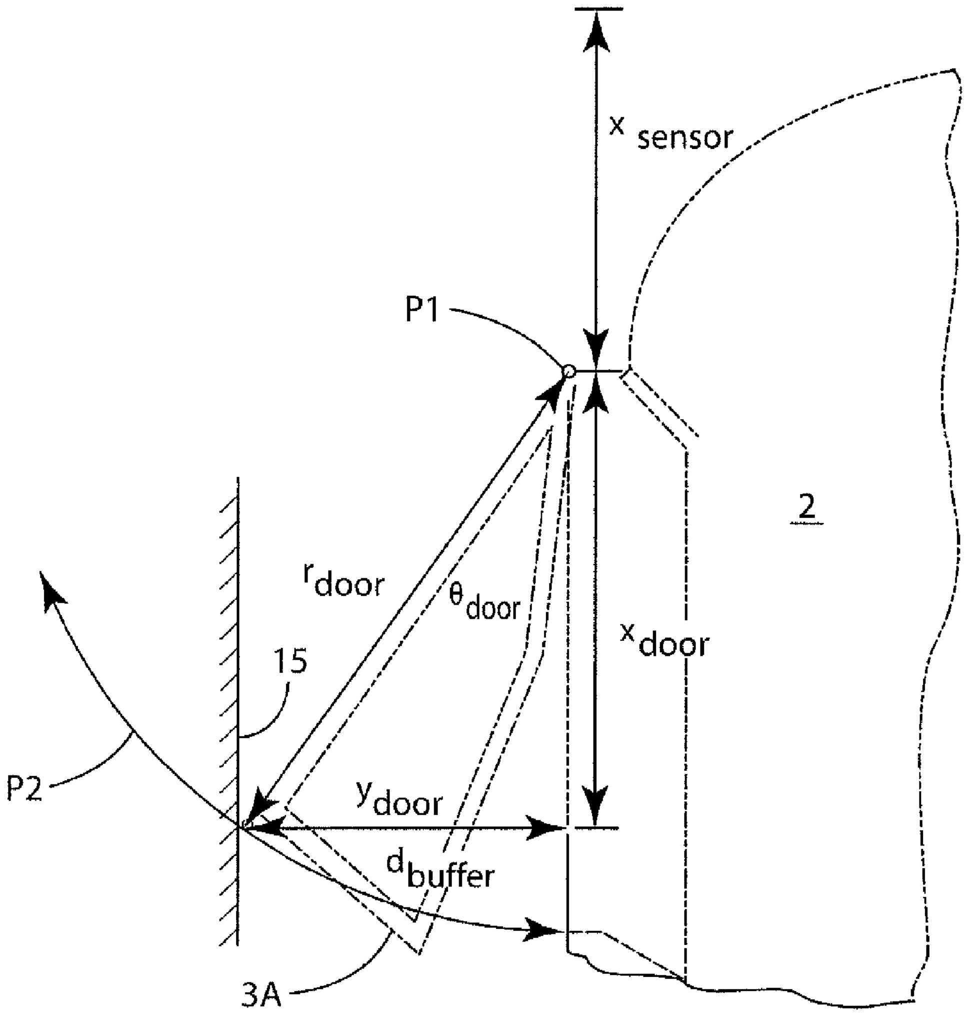
FIG. 3 shows the door swing path intersection to an adjacent object.

With further reference to FIG. 3, knowing the system host vehicle geometry, it only remains to determine if the door swing path will intersect with any adjacent objects and at what arc point this will occur. Determining the door angle position ($\Theta_{door}$) such as with a hall-effect sensor or other method, it can ascertained when the door 3A is approaching an adjacent object 15 ($y_{door} = d_{buffer}$) and activate an electric door brake 8, or other method, to halt movement of door 3A.

In FIG. 3, P1 represents the door pivot point, and the curved line P2 represents the door swing path. The variables shown in FIG. 3 are defined as follows:

$x_{sensor}$=Distance in x direction from sensor to the door pivot point $x_{door}$=Distance in x direction of door tip travel $y_{door}$=Distance in y direction of door tip travel $\theta_{door}$=Angular position of door $r_{door}$=Door width $d_{buffer}$=Distance to adjacent object at ($x_{sensor}+x_{door}$) position as stored in the buffer.

Door swing limit is at the point where door tip travel in the y direction ($y_{door}$) is equal to the distance to the adjacent object ($d_{buffer}$) at ($x_{sensor}+x_{door}$) as stored in the buffer.

$$Y_{door} = d_{buffer} \text{ at } (x_{sensor} + x_{door})$$

where $$x_{door} = r_{door} \sin\theta_{door}$$

and $$y_{door} = r_{door} \cos\theta_{door}$$

Figure 4:
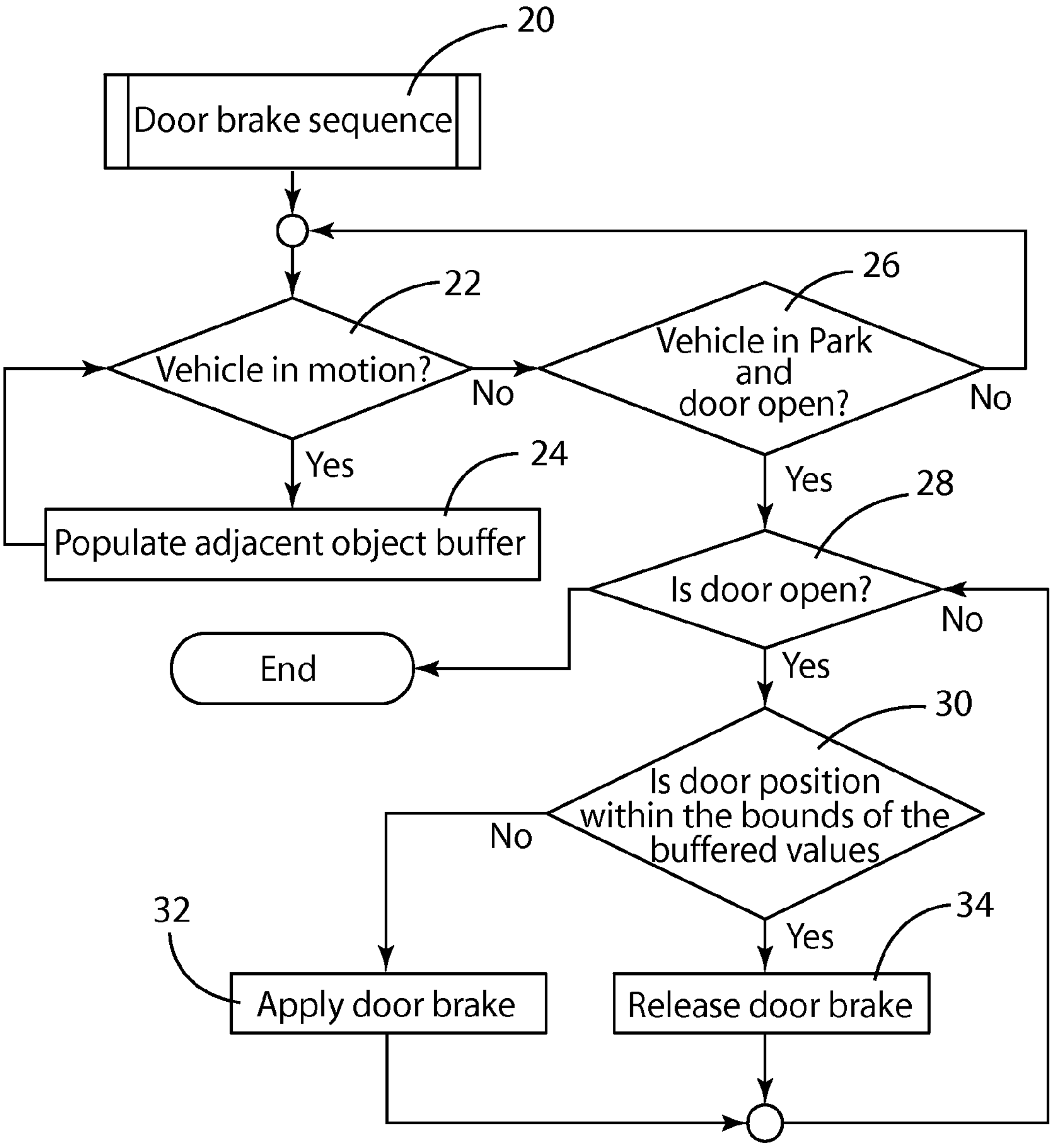
FIG. 4 is a flow chart of data flow for automatic door check operation according to one aspect of the present invention.

An example of potential data flow for automatic door check operation according to one aspect of the present invention is shown in FIG. 4. The door brake is initiated at the block 20 of FIG. 4. The controller 9 first determines if the vehicle is in motion as designated 22 in FIG. 4. If the vehicle is in motion, the adjacent object buffer is populated at 24, and the controller again determines if the vehicle is in motion. If the controller determines that the vehicle is not in motion, the controller then determines if the vehicle is in park at 26. If not, the controller then again determines if the vehicle is in motion at 22. However, if the vehicle is in park, the controller then determines if the door is open at 28. If the door is not open, the door brake sequence ends. If the door is open, the controller then determines if the door position is within the bounds of the buffered values at 30. If not, the door brake is actuated or applied at 32. However, if the door position is within the bounds of the buffered values, the door brake is released (or allowed to remain released) at 34.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A system for controlling movement of a vehicle door relative to a primary vehicle structure, the system comprising:

at least one dual use ultrasonic sensor configured to detect a distance from a vehicle to an object in the vicinity of a vehicle and to provide input to a vehicle automatic parallel parking system and to the system for controlling movement of a vehicle door whereby data from the at least one dual use ultrasonic sensor can be used for automatic parallel parking and for controlling movement of a vehicle door;

a door brake configured to prevent a vehicle door from opening beyond a variable maximum distance;

wherein the system utilizes a plurality of detected distances to a detected object detected by the at least one dual use ultrasonic sensor at different times before a vehicle stops and a plurality of vehicle positions or velocities at different times before a vehicle stops corresponding to the times at which the detected distances are taken to determine a lateral location of the detected object relative to the vehicle door after the vehicle has stopped; and wherein:

the system utilizes the detected distances to a detected object taken at different times before a vehicle stops to selectively actuate the door brake after the vehicle has stopped to prevent the vehicle door from contacting the detected object as the door is opened.

2. The system of claim 1, including:

a position sensor that determines a position of a vehicle door; and wherein:

the system includes a controller configured to determine if a vehicle in which the position sensor is mounted is in motion and if a vehicle door is open, and to determine if a position of the door is within a predefined allowable position relative to the detected object.

3. The system of claim 2, wherein:

the controller utilizes a rolling buffer of data concerning a position of the detected object relative to the at least one ultrasonic sensor to determine if a position of the door is within the predefined allowable criteria.

4. The system of claim 3, wherein:

the door pivots, and the position sensor determines an angle of the door relative to the vehicle as the door is opened.

5. The system of claim 4, wherein:

the controller does not actuate the door brake unless the door is open.

6. The system of claim 5, wherein:

the system includes an adjacent object buffer, and the controller determines if the vehicle is in motion, and populates the adjacent object buffer if the vehicle is in motion.

7. The system of claim 6, wherein:

the controller utilizes sequential pairs of data corresponding to vehicle velocity and measured distance to sequentially determine a plurality of positions of the vehicle relative to a detected object at specified intervals.

8. The system of claim 7, wherein:

the controller populates the adjacent object buffer with positions at the specified intervals.

9. The system of claim 8, wherein:

the at least one ultrasonic sensor is operably connected to an automatic system for parallel parking whereby data from the at least one ultrasonic sensor is utilized to control both the door brake and the automatic system for parallel parking.

10. The system of claim 1, wherein:

the system utilizes measured yaw rates of a vehicle to determine a position of an object relative to the vehicle.

11. The system of claim 10, wherein:

the system utilizes pluralities of sequential vehicle velocities, yaw rates, and object distances measured at specified time intervals to determine a plurality of sequential positions of a detected object relative to the vehicle.

12. A vehicle door system comprising:

at least two object detecting sensors configured to provide distance data to the vehicle door system and to a vehicle parallel parking system;

a door that moves relative to the sensors, the door including a powered brake that stops motion of the door;

a door position sensor; and a controller that populates a buffer with sequentially measured vehicle velocities or positions, yaw rates, and distances to a detected object before the vehicle has stopped, the controller utilizing the measured velocities or positions, yaw rates, and distances measured before the vehicle has stopped to determine a calculated position of the vehicle relative to a detected object after the vehicle has stopped, and selectively actuating the powered brake to prevent the door from contacting the object based on the calculated position of the vehicle relative to a detected object after the vehicle has stopped.

13. The vehicle door system of claim 12;

the controller utilizes velocities, yaw rates and distances to a detected object that are taken at equal time intervals.

14. The vehicle door system of claim 13, wherein:

the at least two object detecting sensors comprise at least two ultrasonic sensors configured to detect objects located laterally on opposite sides of a vehicle.

15. The vehicle door system of claim 14, wherein:

the at least two ultrasonic sensors form part of a vehicle automatic system for parallel parking.

16. The vehicle door system of claim 15, wherein:

the controller populates the buffer unless the vehicle is not in motion.

17. The vehicle door system of claim 16, wherein:

the controller is configured to determine if the vehicle is in Park if the vehicle is not in motion.

18. The vehicle door system of claim 17, wherein:

the controller is configured to determine if the door is open if the controller has previously determined that the vehicle is not in motion and that the vehicle is in Park.

19. A vehicle comprising:

a door having a door brake; and dual use ultrasonic sensors providing object distance, vehicle velocity, and yaw rate data to a control system utilizing the data for automatic parallel parking, generating a distance map of objects during movement of the vehicle, determining an allowable door position based on the distance map when the vehicle stops, and actuating the door brake if a current door position exceeds the allowable door position.

20. The vehicle of claim 19, wherein:

the sensors comprise ultrasonic sensors that are configured to provide distance-to-object information to an automatic parallel parking system.

* * * * *